United States Patent [19]

Muller

[11] Patent Number: 5,310,569
[45] Date of Patent: May 10, 1994

[54] METHOD FOR PRODUCING A STRESS FREE CONTINUOUS DOUGH STREAM

[75] Inventor: Ben Muller, Loveland, Ohio
[73] Assignee: Rykaart, Inc., Hamilton, Ohio
[21] Appl. No.: 985,551
[22] Filed: Dec. 3, 1992
[51] Int. Cl.⁵ ............................. A21D 8/00; A23P 1/00
[52] U.S. Cl. ....................................... 426/504; 366/99; 426/502; 426/517
[58] Field of Search ............... 426/504, 502, 496, 517, 426/549; 366/97, 99

[56] References Cited

U.S. PATENT DOCUMENTS

| | | | |
|---|---|---|---|
| 4,056,346 | 11/1977 | Hayashi | 425/373 |
| 4,192,636 | 3/1980 | Hayashi et al. | 426/504 |
| 4,232,973 | 11/1980 | Ligouzat | 366/157 |
| 4,276,317 | 6/1981 | Hayashi | 426/502 |
| 4,583,930 | 4/1986 | Hayashi | 426/502 |
| 4,631,017 | 12/1986 | Hayashi | 425/373 |
| 4,676,727 | 6/1987 | Atwood | 425/142 |
| 4,692,107 | 9/1987 | Morikawa et al. | 425/373 |
| 4,692,110 | 9/1987 | Hayashi | 425/373 |
| 4,738,861 | 4/1988 | Blain et al. | 426/504 |
| 4,747,690 | 5/1988 | Hayashi | 366/98 |
| 4,790,665 | 12/1988 | Hayashi | 426/504 |
| 4,877,632 | 10/1989 | Nogueroles | 426/502 |
| 4,880,375 | 11/1989 | Hayashi | 426/517 |
| 4,883,417 | 11/1989 | Morikawa et al. | 426/503 |
| 4,902,524 | 2/1990 | Morikawa et al. | 426/502 |
| 4,904,491 | 2/1990 | Morikawa et al. | 426/502 |
| 4,946,699 | 8/1990 | Kageyama et al. | 426/504 |
| 4,957,426 | 9/1990 | Hayashi | 426/502 |
| 5,030,466 | 7/1991 | Kageyama et al. | 426/504 |
| 5,039,542 | 8/1991 | Havashi | 426/502 |
| 5,091,202 | 2/1992 | Hayashi | 426/502 |

*Primary Examiner*—George Yeung
*Attorney, Agent, or Firm*—Wood, Herron & Evans

[57] ABSTRACT

An apparatus and method are disclosed for continuously producing a stress free sheet of dough. The dry ingredients are measured and mixed on a continuous basis and the liquid ingredients are injected into the stream of dry ingredients. The ingredients are then transferred to a temperature controlled kneading chamber which generates a continuous stream of dough. The dough stream is discharged from the kneading chamber without benefit of rollers or stress inducing apparatus through a discharge conduit of predetermined flow resistance. The resulting stress free continuous stream of dough has a well developed and undamaged gluten network producing a high quality dough product.

12 Claims, 3 Drawing Sheets

METHOD FOR PRODUCING A STRESS FREE CONTINUOUS DOUGH STREAM

BACKGROUND OF THE INVENTION

This invention relates to an apparatus and method for commercially producing sheets of dough and more particularly, for producing "stress free" sheets of dough. "Stress free" dough is dough which has not had the gluten of the dough fractured or damaged in the sheeting process.

The current practice for commercially producing sheets of dough by a batch method generally involves measuring the required dry ingredients (i.e., flour, sugar, yeast, etc.) and mixing them with the appropriately measured liquid ingredients (i.e., water, oil, etc.). The resulting dough paste created by mixing of these ingredients is then kneaded until the desired dough mass containing the gluten network is formed. The dough mass is then typically transferred to a retention hopper or bin and commingled with previously prepared batches of dough from which the dough mass is extruded by a combination of peripherally ribbed oppositely rotating discharge rollers which force the dough mass through an extrusion die or restricted opening to form a continuous stream of dough. In the course of forcing the dough through the extrusion die, the discharge rollers forcefully pull small portions of the dough from the large dough mass in the retention bin and push it through the die or restricted opening to form the continuous stream of extruded dough. Once extruded, the stream of dough can be shaped, rolled, or cut to the desired specifications depending on the ultimate dough product (i.e., croissant, bread loaf, bun, pizza crust, etc.).

As the dough is kneaded or worked during the kneading process, the gluten network is generated in the dough. The gluten network is a highly elastic and cohesive gel structure which is generally indicative of the quality of the dough. The more developed and undamaged the gluten network remains in the dough, the higher the quality of the resulting dough product. Gluten in the dough is damaged or destroyed as a result of high stresses or shear forces applied to the dough. Therefore, the less stress imparted to the dough or the more "stress free" the dough remains during the formation of a dough stream, the higher the quality of the resulting dough product.

In the practice of the above described commercial process for producing a continuous sheet of dough, peripherally ribbed discharge rollers which pull the dough from the retention bin and force it into the extrusion die exert a significant shear or tearing force on the dough. These shear forces greatly damage and destroy the gluten network. Additionally, the mechanical work energy of the discharge rollers applied to the dough in the course of shearing it from the dough mass and forcing it through the extrusion die, increases the temperature of the dough by as much as 5° F. This temperature increase further damages the dough.

In addition to the damage to the dough mass imparted by the shear stress and the increase in temperature of the dough, the compression forces applied to the dough by the discharge rollers further damage the dough. The resulting stream of compressed dough emerging from the extrusion die is difficult to shape and form because of these compression forces. The damaged dough can be partially restored if passed through a series of rollers and shapers, but this corrective measure is much more timely and costly than if the dough had never been compressed and the gluten network damaged in the first place. An additional corrective measure common in the industry to rehabilitate compressed dough and the damaged gluten network thereof is to leave the dough to rest for as much as two hours after extrusion from the retention bin. Once again, this practice serves to only partially regenerate the gluten and is inherently time consuming and a further complicating requirement to produce a continuous sheet of quality stress free dough. The dough which has been rehabilitated is still of a lesser quality and resistant to shaping than "stress free" dough.

There are prior patents directed to methods and apparatus for producing a continuous stream of stress free dough. U.S. Pat. No. 5,091,202, for example, discloses a dough hopper with a pair of vertically mounted conveyors and a pair of discharge rollers positioned below an opening in the bottom of the hopper. The continuous stream of dough is produced according to the disclosure of this patent by pulling the dough out of the hopper opening and sandwiching it between the conveyors and then the discharge rollers. The dough is flattened and narrowed to achieve a stream of dough by controlling the cross-sectional area between the conveyors and between the rollers and regulating their respective rotational velocities. However, the gluten is still damaged with such a method due to the compressive forces between the conveyors and rollers and the work energy converted to heat energy when applied to the dough by the conveyor and roller rotation.

Similarly, U.S. Pat. No. 4,276,317 discloses a method for producing a strip of dough by means of a plurality of opposing pairs of discharge rollers positioned below a dough hopper. The rollers form the strip of dough by reducing the spacing between each successive pair of discharge rollers thereby flattening the dough as it passes between the rollers. The resulting dough stream generated by the practice of this patent is also not truly stress free due to the compressive forces and the temperature rise experienced by the dough according to the practice of this patent.

Another method for producing a continuous stream of "stress free" dough is disclosed in U.S. Pat. No. 4,904,491 in which the dough is severed into portions by cutter blades at the bottom of a dough hopper. The blades section the dough into individual portions which are weighed and placed on a conveyor to occupy a space proportional to its mass. The speed of the conveyor is controlled to correspond to the mess of each portion of dough and each successive portion is positioned to overlap the previous portion, thereby forming a continuous stream of dough when rolled and shaped appropriately. Although gluten damaging excessive pressures are reduced, the involved steps of weighing each portion of dough and regulating the conveyor to overlap each portion complicate the dough stream production. In addition, cutting the dough into individual portions severs the gluten network formed in the dough thereby requiring reformation of the gluten network when the dough is ultimately formed into a stream.

The so called "stress free" systems described in the above identified patents are all based on a batch process where the dough is mixed and kneaded in a batch mixer. Batch sizes can vary from as little as 100 pounds to as much as 2,000 pounds per batch.

In the time frame of starting and finishing the use of the batch, time lapses of up to 20 minutes are common. The dough structure changes due to continuing moisture absorption, development of yeast and relaxation of gluten during this time frame. This results in changes of quality from beginning to end of batch, as well as changes of consistency and workability of the dough.

This inconsistency requires specialized, automated sheeting systems to produce a more consistent finished product. The invention of this application mixes and kneads the dough continuously which results in consistent dough throughout the process since each dough particle has the same mix time, knead time and rest time.

The system of this invention makes it possible to use lower amounts of yeast, since lapse times between mixing and finishing the final product can be as little as two minutes, which results in very little to no yeast development. This is a big advantage, particularly for frozen dough products.

SUMMARY OF THE INVENTION

It has therefore been an objective of the invention to provide an apparatus and method for producing a stress free, continuous sheet of dough which maintains the gluten network in the dough and thereby avoids the need to rehabilitate the damaged gluten at a later stage in the dough making process.

This objective of the invention is achieved with an apparatus which continually produces dough without imparting excessive pressure or force on the structure of the dough nor appreciably raising the temperature of the dough. The dough sheet is produced according to the practice of this invention by continually mixing the dry and liquid ingredients, continually kneading the ingredients within a kneader into a dough structure, and continually discharging a dough stream from the kneader without utilizing the above described batch method which imparts shear stress and heat to the dough mass in the course of removing the dough from the retention bin. The resulting stress free dough stream alleviates the need to rehabilitate the gluten structure, and the resulting stress free dough eliminates the time consuming step of leaving the extruded dough to rest and re-form the gluten network.

The apparatus of the present invention initiates the process of producing a continuous stress free dough stream by continuously measuring and discharging a calibrated amount of each dry ingredient from a series of individual dry ingredient tanks. Typically, the dry ingredients consist of flour, sugar, and other components as required. Each is contained in a separate tank having the capability of discharging a regulated amount of dry ingredient. The measured dry ingredients are then transferred to a continuous mixer where the specified liquid ingredients are injected and mixed into the stream of dry ingredients. Complete moisture absorption of the liquid ingredients is achieved upon injection and mixing to form a dough paste.

The resulting dough paste stream discharged from the continuous mixer is then fed into a kneading chamber. The kneading is a continuous operation in that the dough paste is input at one end of the chamber and progresses through the chamber and a dough stream is discharged from the opposite end of the kneading chamber. The required amount of yeast is added to the dough during kneading. The kneading chamber of the present invention is temperature regulated to create a controlled kneading process whereby optimum quality dough is produced. The dough stream exits the kneading chamber as a continuous stream of dough via a dough stream forming die located in the side wall of the kneading chamber and is formed without passage thru a conventional retention bin and dough extruder.

An advantageous feature of the present invention is that by continuously feeding the dough paste into the kneading chamber, continuously kneading the dough paste, and continuously removing the resulting dough mass from the kneading chamber thru a dough stream forming die, the resulting dough is continually discharged from the kneading chamber as a stream without the requirement of passage thru a retention bin and stress inducing feed rollers and extrusion die as in the batch method. The configuration of the forming die or discharge orifice on the kneading chamber has a predetermined flow resistance which serves to fully coalesce the dough stream without imparting gluten damaging stress or heat. Once discharged from the kneading chamber, the dough stream can be shaped into the desired sheet form depending on the dough product to be made from the dough.

BRIEF DESCRIPTION OF THE DRAWINGS

The objectives and advantages of the present invention will become more readily apparent from the following detailed description taken in conjunction with the accompanying drawings in which.

DETAILED DESCRIPTION OF THE INVENTION

Figures 1, 5:
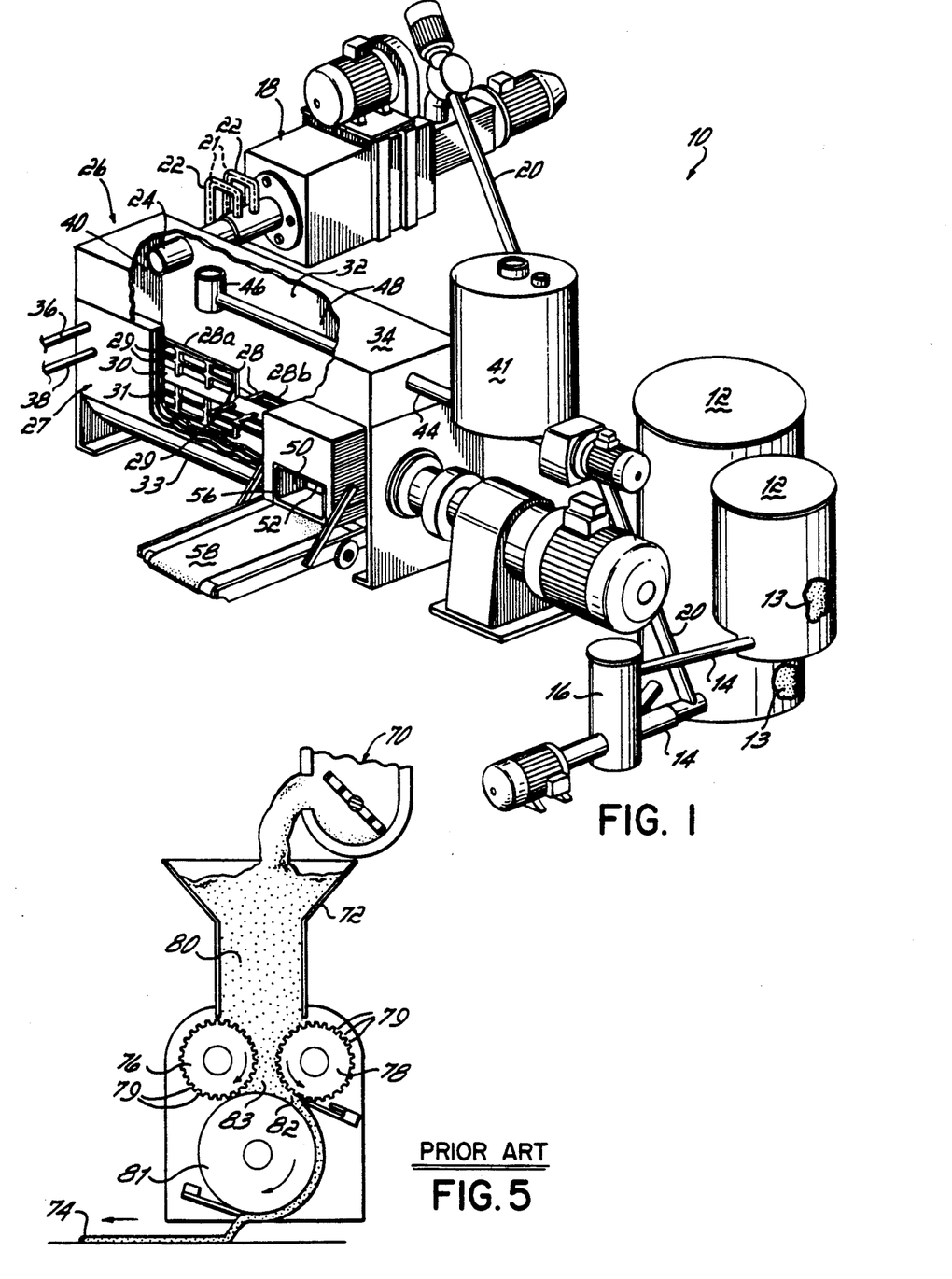
FIG. 1 is a perspective view of a system for producing a stress free continuous dough stream of the present invention.
FIG. 5 is a schematic side view of the prior art kneading chamber, retention bin and discharge extrusion rollers.

A system 10 for producing a stress free continuous dough stream is shown in FIG. 1. Dry ingredient tanks 12 containing dry ingredients 13 such as flour, salt, and other granular components are interconnected by feed tubes 14 which lead to a blender 16. The dry ingredients 13 can be transferred through the feed tubes 14 by a worm gear or other suitable mechanism for transferring flowable solid products. The blender 16 mixes the dry ingredients 13 which are then transferred to a continuous mixer 18 by a feed tube 20. In the preferred embodiment of the present invention, the continuous mixer 18 is of a type disclosed in U.S. Pat. No. 4,232,973, incorporated herein by reference, which is suitable for the practice of this invention. The continuous mixer 18 receives both the dry ingredients 13 from the feed tube 20 and a combination of liquid ingredients 21 from injection tubes 22. The liquid ingredients 21 typically consist of oil and water in specified amounts. The continuous mixer 18 in the preferred embodiment of the present invention is able to fully mix the liquid 21 and dry ingredients 13 to achieve complete liquid ingredient absorption and produce a dough paste 23 (FIG. 2) which exits through a discharge tube 24 of the continuous mixer 18.

The dough paste stream 23 flows through the discharge tube 24 from the continuous mixer 18 to a kneader 26. In the present invention, the kneader 26 is a long chamber 27 having a semi-circular bottom wall 33, vertical side walls 32, and a cover 34. A plurality of kneading paddles 28 extends radially from a common longitudinally extending drive shaft 30 contained within the kneading chamber 27. In the preferred embodiment, there are four kneading paddles 28 extending from the common drive shaft 30. The kneading paddles 28 are arranged in opposed pairs, with one diametrically opposed pair of paddles 28a located on one end of the shaft 30 and a second diametrically opposed pair 28b located on the opposite end orthogonally oriented in relation to the first pair 28a. Each kneading paddle 28 consists of a pair of longitudinal fins 29 which are generally parallel to the drive shaft 30. The fins 29 are joined to the drive shaft 30 by radially extending ribs 31 projecting from the drive shaft 30.

The kneading chamber 27 is temperature controlled in the preferred embodiment of the present invention. The vertical walls 32 and bottom wall 33 of the kneading chamber 27 are hollow or multilayered and adapted to receive a temperature controlling fluid via an inlet port 36. The fluid is circulated in the kneading chamber walls 32, 33 and exits through an outlet port 38.

The kneading of the dough paste 23 by the rotation of the kneading paddles 28 within the kneading chamber 27 produces a dough mass 35. As the dough paste 23 is kneaded, a gluten network develops within the dough mass 35. Gluten is a highly elastic and cohesive gel structure within the dough. Dough with a well developed gluten structure can be detected by axially pulling or stretching the dough by hand resulting in a thin uniform translucent membrane. Dough with a damaged gluten network will tear prior to forming the membrane when manipulated as described. During baking, the gluten network traps individual pockets of gas within the dough thereby producing a more flaky and desirable dough product.

In operation, the dough paste 23 is continually fed into one end 40 of the kneading chamber 27. The kneading paddles 28 continuously rotate to generate the kneading action which transforms the dough paste 23 into the dough mass 35. Yeast 41 in regulated quantities is mixed with the forming dough in the kneader 26 and is dispensed from a yeast storage tank 42 through a yeast feed tube 44 and dispersion nozzle 46. Alternatively, the yeast 41 can be injected with the liquid ingredients 21 into the continuous mixer 18 via the injection tubes 22. The yeast can also be injected as a fermented liquid sponge which adds a desirable flavor to certain dough products such as pizza and other bread products.

As a result of the dough paste 23 being continually fed into the first end 40 of the kneading chamber 27, and the continuous rotation of the mass of dough 35 and dough paste 24 in the kneading chamber, the dough mass 35 in the chamber naturally tends to be transferred by the kneading paddles 28 towards the opposite end 48 of the kneading chamber 27. The rate at which the dough paste 23 is input to the first end 40 of the kneading chamber 27 controls the rate at which the dough mass 35 exits the kneading chamber 27 through a discharge conduit 50 positioned in the side wall of the kneading chamber 27 at the opposite or second end 48 of the kneading chamber 27.

The dough mass 35 exits thru the discharge conduit 50 as a result of the centrifugal force generated by the rotating kneading paddles 28. The configuration of the dough mass 35 in the kneading chamber 27 is generally that of an annular tube of dough 53. The annular tube of dough 53 is a product of the centrifugal force of the rotating kneading paddles 28 forcing the dough mass 35 to the outermost radial portions of the paddles 28. As the paddles 28 rotate through a path corresponding to the semi-circular arc of the bottom wall 33 of the kneading chamber 27, dough accumulates on the outermost radial portion of the paddles 28 due to the limited clearance between the paddles 28 and bottom wall 33. As the paddles 28 rotate past the bottom wall 33 and the adjacent vertical side wall 34, the accumulations of dough form into oblate spheroids 52 on the outermost radius of the paddles 28. In the upper portion of the arcuate path of the paddles 28, the walls 33, 34 of the kneading chamber 27 no longer inhibit the centrifugal force acting on the oblate spheroids of dough 52 which then travel outward from the drive shaft 30 and are deposited at the discharge conduit 50 as the paddles 28 complete a revolution.

Figure 3:
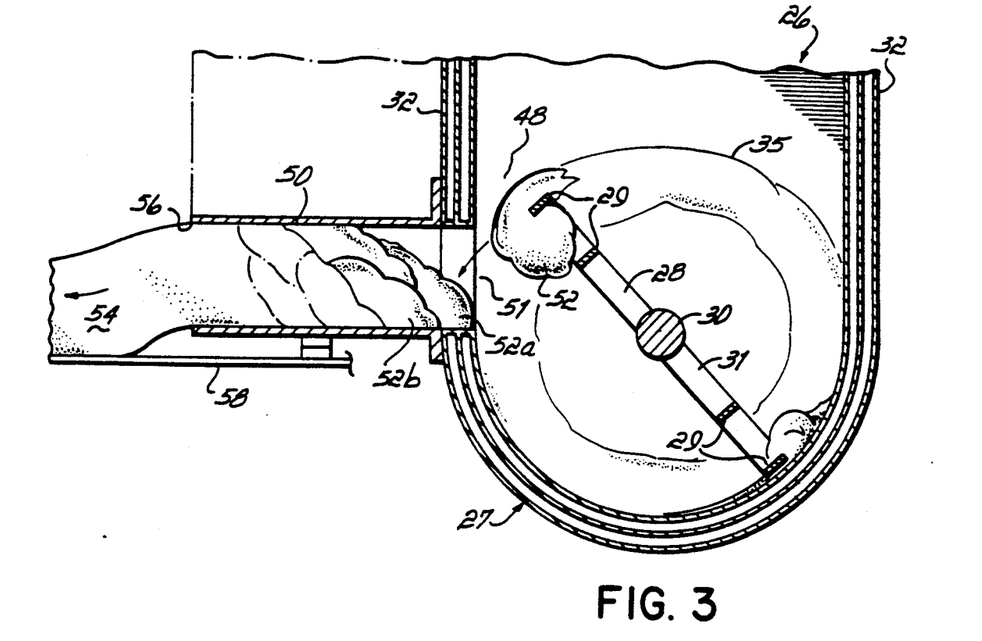
Figure 4:
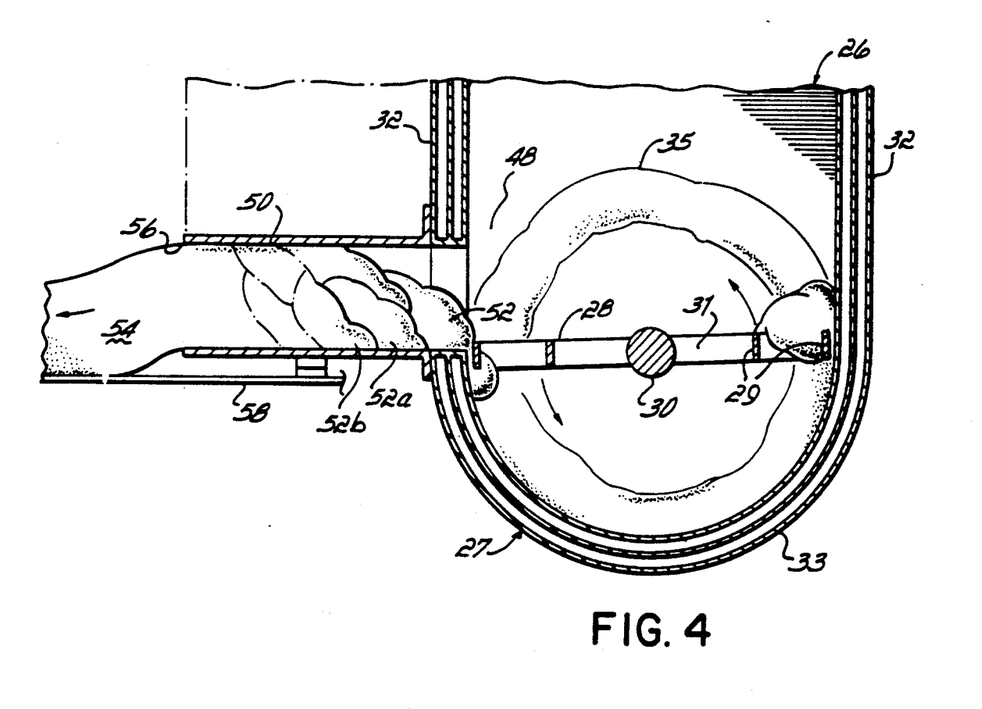

The dough tends to accumulate on and in front of the kneading paddles 28 due to the coherent nature of the gluten. These accumulations of dough form into the generally oblate spheroid shapes 52 of dough on the outermost radial portions of the rotating dough mass 35. These oblate spheroids 52 of dough rotate with the kneading paddles 28 producing a cyclic wave-like motion within the annular tube of dough 53. Multiple oblate spheroids 52 of forming dough on the plurality of kneading paddles 28 accentuate the wave-like effect and enhance the flow of dough paste 23 from the first end 40 of the kneading chamber 26 to the discharge conduit 50 at the second end 48. When the oblate spheroids of dough reach and pass the entrance 51 to the discharge conduit 50, portions 52a of the oblate spheroids 52 of dough are deposited in the discharge conduit 50 by the centrifugal force of the rotating kneading paddles 28. The deposited portion 52a of one oblate spheroid laps up against a previously deposited oblate spheroid portion 52b to force the previously deposited portion forwardly or toward a discharge orifice 56 of the conduit 50. This process can be seen in the sequential views of FIGS. 2-4. The discharge conduit 50 is of sufficient flow resistance to retard the flow of the serially lapping portions 52a, 52b of the oblate spheroids 52 of dough exiting the kneading chamber 27, thereby coalescing them into a homogenous and continuous dough stream 54 as the dough exits the conduit 50.

Figure 2:
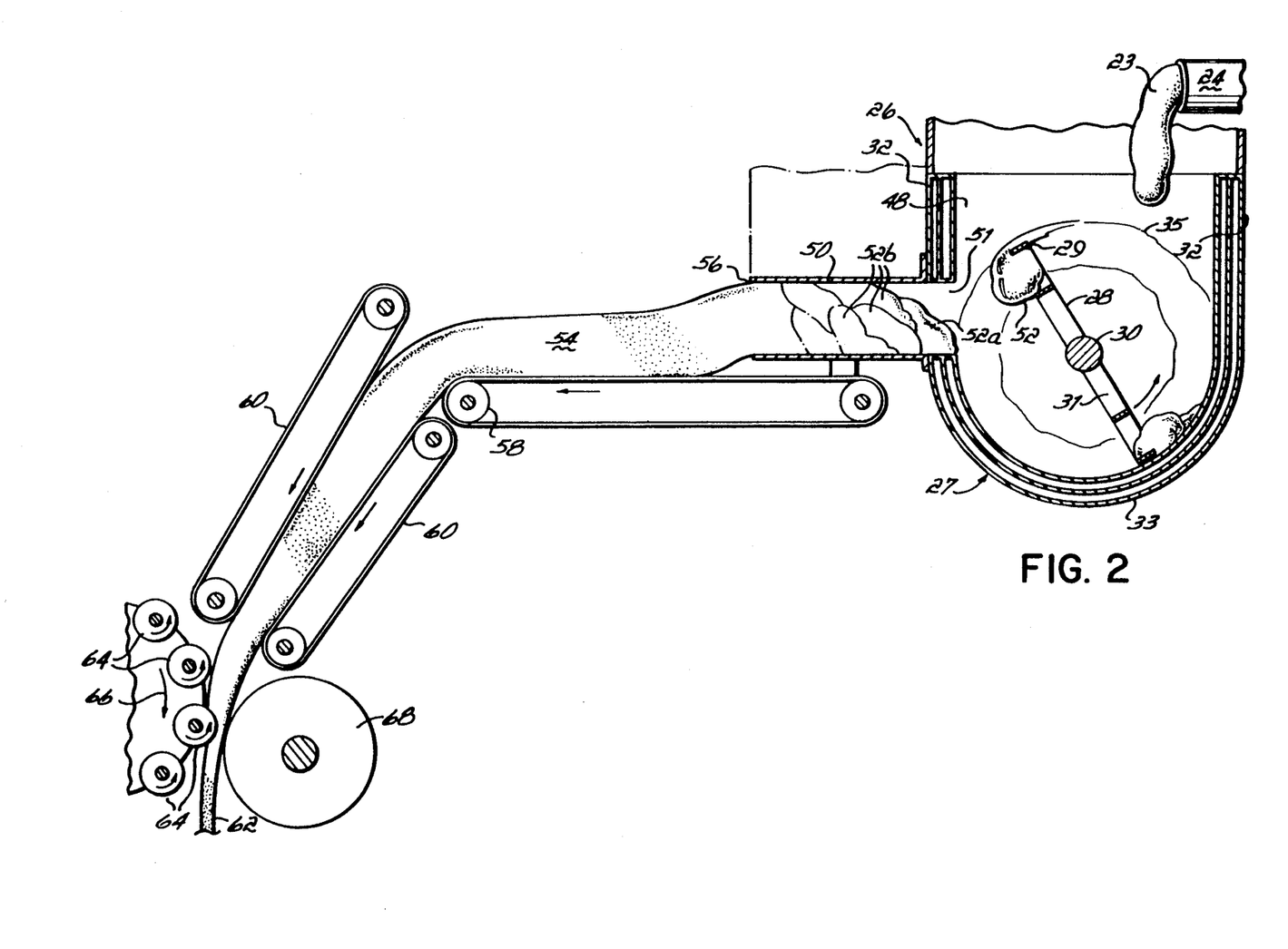
FIGS. 2, 3, 4 are sequential cross-sectional plan views of the kneading chamber, kneading paddles, discharge conduit, and conveyor of the present invention illustrating the process by which the stress free dough is moved from the kneading chamber thru a forming die to form a continuous stream of stress free dough.

In the preferred embodiment of the present invention, the discharge conduit 50 is generally rectangular and approximately 4" in height, 12" in width, and 10" in length. The dough stream 54 exits the discharge conduit 50 through the discharge orifice 56 onto a system of conveyor belts and rollers. As seen in FIG. 2, the discharged stream of dough 54 is transferred by a first conveyor belt 58 to a pair of opposing conveyor belts 60. The dough stream 54 is then sandwiched between the pair of conveyor belts 60 thereby increasing its width and reducing its height by approximately a 2:1 ratio. A dough sheet 62 is formed once the dough stream 54 exits the pair of conveyor belts 60 and is rolled into a sheet by a multiroller system consisting of a number of individually rotating rollers 64 moving in a continuous path 66 over the dough on a single roller 68 as shown in FIG. 2. The continuous dough sheet 62 is then transferred to the appropriate shaping stations depending upon the type of dough in production.

As the dough stream 54 exits the kneader 26 through the discharge conduit 50, the gluten network developing within the dough is not damaged. The dough stream 54 is not exposed to the excessive compression and shear forces nor temperature increases which damage the gluten as in the prior art methods such as that illustrated in FIG. 5. With the present invention the dough stream 54 experiences only a pushing force or pressure as it exits the discharge orifice 56 from subsequent oblate spheroids 52 of dough which are approaching the discharge conduit 50 of the kneader 26. This pushing force is only sufficient to overcome the frictional flow resistance of the discharge conduit 50 and form the dough stream 54 without damaging the gluten.

In contrast to the present invention, the prior art apparatus shown in FIG. 5 produces dough in a kneader 70 which is deposited into a dough retention hopper 72. In order to form the dough 80 in the hopper into a dough stream 74, oppositely rotating discharge rollers 76, 78, at least one of which has lengthwise ribs 79 on the periphery thereof, grab onto and pull small portions of the dough from the larger mass, and force those smaller portions downwardly as a compacted stream through a restricted opening or extrusion opening 82 between the discharge rollers 76, 78 and around a forming roll 81 to form a dough stream 74 with damaged and compacted gluten therein. In this process of pulling the smaller portion of dough from the mass and then reforming it into a dough stream 74, the dough experiences a temperature increase generally on the order of 5° F. This temperature increase further damages the gluten network, producing a dough stream 74 of lesser quality than the dough stream 54 created by the practice of the present invention.

In addition to comparing temperature differences resulting from the practice of this invention and the prior art practices illustrated in FIG. 5, pressure measurements were taken of the dough in the discharge conduit 50 of the present invention and the dough in the restricted opening 83 between the rollers 76, 78, 81 of the apparatus illustrated in FIG. 5. The pressure in the discharge conduit 50 was measured and determined to be approximately 2.11 psi. In contrast, utilizing the same dough mixture and kneader, the pressure of the dough in the restriction between the rollers 76, 78, 81 of a conventional extruder made in accordance with FIG. 5 measured to be approximately 12.63 psi. This pressure differential of over 10 psi highlights the advantages of the present invention to produce a continuous sheet of stress free dough. Therefore, the pressure of the dough in the discharge conduit 50 is preferably less than 10 psi, better yet less than 6 psi, and in the preferred embodiment is approximately 2 psi. The reduced pressure process of the present invention produces a more stress free dough stream than prior art methods, thereby avoiding the need to rehabilitate the gluten.

In order to further demonstrate the differences in the dough sheet 62 resulting from the practice of this invention and the dough sheet 74 resulting from the prior art apparatus of FIG. 5, extensigraph test measurements were taken. Dough extensibility and resistance to extension were measured by a Brabender Extensigraph which measures in brabender units (BU) the amount a specimen of dough weighing 150 grams and 15 cm in length stretches until it is broken by a hook moving at a constant speed. Measurements were taken at the National Technical Institute in Holland of three samples of dough having identical composition of ingredients consisting of Wessanen French bread flour (100 parts), water (58 parts), salt (2 parts), yeast (5 parts), gluten (2 parts), and S-500 dough conditioner (2 parts). The production capacity of the dough was 650 kilograms per hour and the dough temperature was 21° C. when tested.

The Brabender Extensigraph readings were made within 10 minutes after taking the dough samples. The Brabender Extensigraph records in BU's the height on a graph corresponding to the extensibility and resistance to extension. The higher the recorded BU height for a given sample of dough the greater length the dough was stretched before breaking which indicates a more developed and undamaged gluten network. Both the extensibility in BU's and length the dough was stretched in centimeters were measured.

In addition, consistency of the dough samples was measured with a Tamson penetrometer using a cone with a top angle of 60°. The cone was allowed to penetrate each dough sample for 10 seconds at which time the penetration depth in millimeters was recorded. Dough which has been damaged in the sheeting process will be less resistant to the penetrator than dough with a well developed gluten network.

All three samples tested include dough which had been identically mixed and kneaded. Sample (A) was taken directly from the dough stream 54 in the discharge conduit 50 after exiting the kneader 26 of the present invention. Sample (B) was sheeted between the pair of conveyor belts 60 to a thickness of 40 mm and subsequently reduced to a 10 mm thickness by the multi-rollers 64 and single roller 68 and taken from the dough sheet 62 of the present invention. Sample (C) was sheeted to a thickness of 10 mm by a prior art apparatus similar to the one shown in FIG. 5 taken from the dough sheet 74. The results of the tests are set forth in the following table.

|  | (A) Present Invention Dough Stream 54 | (B) Present Invention Dough Sheet 62 | (C) Prior Art Extruded Dough 74 |
| --- | --- | --- | --- |
| Extensigraph |  |  |  |
| Height (BU) | 850 | 1000 | 320 |
| Length Stretched (mm) | 110 | 135 | 90 |
| Penetrometer Penetration Depth (mm) | 163 | 164 | 170 |

These results emphasize the advantages of the present invention in producing a stress free continuous sheet of dough. The undamaged gluten network contained in the dough sheet 62 and dough stream 54 produced by the practice of this invention yielded extensigraph readings of 1000 BU and 850 BU, respectively; whereas, dough 74 resulting from the extrusion process yielded only 320 BU on the extensigraph. Furthermore, the length the dough was stretched prior to breaking was 135 mm and 110 mm for the dough sheet 62 and the dough stream 54 of the present invention, but the dough 74 from the prior art method stretched only 90 mm before breaking. Likewise, the penetrometer was measured at a depth of 170 mm in the extruded dough 74, but only 164 mm for the present invention dough sheet 62 and 163 mm for the dough stream 54. These measurements further serve to illustrate the advantages of the present invention over the prior art methods.

Furthermore, photographs of microscopic views of each of the tested dough samples were taken to detail the protein gluten network present therein. The microscopic photograph of sample (C) shows the damaged gluten network appearing as concentrated red colored regions interspersed among the dough structure. In contrast, the microscopic photographs of samples (A) and (B) reveal a uniform undamaged gluten network with few if any concentrated red colored regions. This photographic evidence further demonstrates the advantages of the present invention to producing a stress free sheet of dough.

The process of forming a stress free continuous dough stream 54 from the above-described apparatus begins with measuring and premixing the dry ingredients 13 which are then injected with the liquid ingredients 21 in a continuous mixing process. The continuous mixing process achieves full absorption of the liquid ingredients 21 and generates a dough paste 23. The dough paste 23 is then kneaded to form the dough 35 and generate a gluten network within the dough 35. Yeast 41 is mixed with the dough 35 during the kneading process or injected with the liquid ingredients 21 into the continuous mixer 18. The yeast can also be a fermented liquid sponge. The dough 35 is continuously kneaded until it is to be discharged through the discharge conduit 50 onto a conveyor belt 58, transferring the dough stream 54 to a multiroller system 64 which produces a dough sheet 62 to be transferred to other shaping stations as required. The continual operation of each step in the process delivers a continuous stress free dough sheet 62 with a well developed gluten network intact, thereby alleviating the need to regenerate or rehabilitate the gluten structure.

From the above disclosure of the general principles of the present invention and the preceding description of the preferred embodiment, those skilled in the art will readily comprehend various modifications to which the present invention is susceptible. Therefore, we desire to be limited only by the scope of the following claims and equivalents thereof:

We claim:

1. A method for continuously producing a stress free sheet of dough comprising the sequential steps of:
   continuously supplying a regulated quantity of blended dry ingredients to a mixing chamber to create a mixed stream of dry ingredients;
   continuously injecting a regulated volume of liquid ingredients into said continuously moving stream of dry ingredients;
   continuously mixing said dry ingredients and said liquid ingredients to form a dough paste stream;
   continuously kneading said dough paste stream to form a continuous dough stream;
   after kneading of said dough stream, continuously discharging said dough stream without damaging a gluten network of said dough developed during said kneading step, said dough stream being discharged through a discharge conduit of pre-determined flow resistance, said dough stream being formed from generally oblate spheroids of dough which are repeatedly lapped onto one another in said discharge conduit as a result of centrifugal force generated during said kneading step, said generally oblate spheroids of dough accumulating in said discharge conduit and forming said dough stream upon exiting a discharge orifice of said discharge conduit; and
   forming said dough stream after emerging from said discharge orifice of said discharge conduit into a continuously moving sheet of dough while maintaining said gluten network in an undamaged condition.

2. A method for continuously producing a stress free sheet of dough comprising the sequential steps of:
   continuously supplying a regulated quantity of blended dry ingredients to a mixing chamber to create a mixed stream of dry ingredients;
   continuously injecting a regulated volume of liquid ingredients into said continuously moving stream of dry ingredients;
   continuously mixing said dry ingredients and said liquid ingredients to form a dough paste stream;
   continuously kneading said dough paste stream to form a continuous dough stream;
   continuously discharging dough through a discharge conduit without having damaged a gluten network formed in said dough, said dough stream being formed from generally oblate spheroids of dough which are repeatedly lapped onto one another in said discharge conduit as a result of said kneading step, said generally oblate spheroids of dough accumulating in said discharge conduit and forming said dough stream upon exiting a discharge orifice of said discharge conduit; and
   transporting said continuous stress-free dough stream to a sheeting station while maintaining the gluten network in said dough stream in an undamaged condition.

3. A method for continuously producing a stress free stream of dough comprising the sequential steps of:
   continuously supplying a regulated quantity of blended dry ingredients to a mixing chamber to create a mixed stream of dry ingredients;
   continuously injecting a regulated volume of liquid ingredients into said continuously moving stream of dry ingredients;
   continuously mixing said dry ingredients and said liquid ingredients to form a dough paste stream;
   continuously kneading said dough paste stream to form a continuous dough stream;
   after kneading of said dough stream, continuously discharging said dough stream without damaging a gluten network of said dough developed during said kneading step, said dough stream being discharged onto a conveyor via a flow discharge conduit without any appreciable temperature change as a result of said discharge step, said dough stream being formed from generally oblate spheroids of dough which are repeatedly lapped onto one another in said discharge conduit as a result of said kneading step, said generally oblate spheroids of dough accumulating in said discharge conduit and forming said dough stream upon exiting a discharge orifice of said discharge conduit; and
   shaping said dough stream into a desired form.

4. A method for continuously producing a stress free stream of dough comprising the sequential steps of:
   continuously supplying a regulated quantity of blended dry ingredients to a mixing chamber to create a mixed stream of dry ingredients;
   continuously injecting a regulated volume of liquid ingredients into said continuously moving stream of dry ingredients;

continuously mixing said dry ingredients and said liquid ingredients to form a dough paste stream;

continuously kneading said dough paste stream to form a continuous dough stream;

continuously discharging said dough stream after said kneading step without damaging a gluten network in said dough stream, said dough stream being discharged through a discharge conduit of predetermined flow resistance onto a conveyor, said flow resistance being just sufficient to shape said dough stream into the shape of a discharge orifice of said conduit, said dough stream being formed from generally oblate spheroids of dough which are repeatedly lapped onto one another in said discharge conduit as a result of said kneading step, said generally oblate spheroids of dough accumulating in said discharge conduit and forming said dough stream upon exiting said discharge orifice of said discharge conduit; and shaping said dough stream into a desired form.

5. A method for continuously producing a stress free stream of dough comprising the sequential steps of:

continuously supplying a regulated quantity of blended dry ingredients to a mixing chamber to create a mixed stream of dry ingredients;

continuously injecting a regulated volume of liquid ingredients into said continuously moving stream of dry ingredients;

continuously mixing said dry ingredients and said liquid ingredients to form a dough paste stream;

continuously kneading said dough paste stream to form a continuous dough stream;

continuously discharging said dough stream after said kneading step without damaging a gluten network in said dough stream, said dough stream being discharged onto a conveyor via a flow discharge conduit of limited length in the flow direction, which length is just sufficient to cause said dough stream to form a desired shape determined by flow through said discharge conduit, said dough stream being formed from generally oblate spheroids of dough which are repeatedly lapped onto one another in said discharge conduit as a result of said kneading step, said generally oblate spheroids of dough accumulating in said discharge conduit and forming said dough stream upon exiting a discharge orifice of said discharge conduit; and shaping said dough stream into a desired form.

6. A method for continuously producing a stress free stream of dough comprising the sequential steps of:

continuously supplying a regulated quantity of blended dry ingredients to a mixing chamber to create a mixed stream of dry ingredients;

continuously injecting a regulated volume of liquid ingredients into said continuously moving stream of dry ingredients;

continuously mixing said dry ingredients and said liquid ingredients to form a dough paste stream;

continuously kneading said dough paste stream to form a continuous dough stream;

continuously discharging said dough stream after said kneading step without damaging a gluten network in said dough stream, said dough stream being discharged onto a conveyor via a flow discharge conduit, said dough being exposed to a pressure less than approximately 10 psi in the course of said dough stream flowing from kneading through said discharge conduit, said dough stream being formed from generally oblate spheroids of dough which are repeatedly lapped onto one another in said discharge conduit as a result of said kneading step, said generally oblate spheroids of dough accumulating in said discharge conduit and forming said dough stream upon exiting a discharge orifice of said discharge conduit; and shaping said dough stream into a desired form.

7. A method for continuously producing a stress free stream of dough comprising the sequential steps of:

continuously supplying a regulated quantity of blended dry ingredients to a mixing chamber to create a mixed stream of dry ingredients;

continuously injecting a regulated volume of liquid ingredients into said continuously moving stream of dry ingredients;

continuously mixing said dry ingredients and said liquid ingredients to form a dough paste stream;

continuously kneading said dough paste stream to form a continuous dough stream;

continuously discharging said dough stream after said kneading step without damaging a gluten network in said dough stream, said dough stream being discharged onto a conveyor via a flow discharge conduit while being exposed to a pressure just sufficient to cause said dough stream to form a desired shape determined by flow through said discharge conduit, said pressure being less than approximately 6 psi, said dough stream being formed from generally oblate spheroids of dough which are repeatedly lapped onto one another in said discharge conduit as a result of said kneading step, said generally oblate spheroids of dough accumulating in said discharge conduit and forming said dough stream upon exiting a discharge orifice of said discharge conduit; and shaping said dough stream into a desired form.

8. A method for continuously producing a stress free stream of dough comprising the sequential steps of:

continuously supplying a regulated quantity of blended dry ingredients to a mixing chamber to create a mixed stream of dry ingredients;

continuously injecting a regulated volume of liquid ingredients into said continuously moving stream of dry ingredients;

continuously mixing said dry ingredients and said liquid ingredients to form a dough paste stream;

continuously kneading said dough paste stream to form a continuous dough stream;

continuously discharging said dough stream after said kneading step without damaging a gluten network in said dough stream, said dough stream being discharged onto a conveyor via a flow discharge conduit while being exposed to a pressure just sufficient to cause said dough stream to form a desired shape determined by flow through said conduit, said pressure being approximately 2 psi, said dough stream being formed from generally oblate spheroids of dough which are repeatedly lapped onto one another in said discharge conduit as a result of said kneading step, said generally oblate spheroids of dough accumulating in said discharge conduit and forming said dough stream upon exiting a discharge orifice of said discharge conduit; and shaping said dough stream into a desired form.

9. A method for continuously producing a stress free stream of dough comprising the sequential steps of:

continuously supplying a regulated quantity of blended dry ingredients to a mixing chamber to create a mixed stream of dry ingredients;

continuously injecting a regulated volume of liquid ingredients into said continuously moving stream of dry ingredients;

continuously mixing said dry ingredients and said liquid ingredients to form a dough paste stream;

continuously kneading said dough paste stream to form a continuous dough stream;

continuously discharging said dough stream through a discharge conduit without damaging a gluten network of said dough developed during said kneading step, said dough experiencing only a pushing force as a result of said discharge step, said pushing force being just sufficient to overcome the frictional resistance to flow through said discharge conduit, said dough stream being formed from generally oblate spheroids of dough which are repeatedly lapped onto one another in said discharge conduit as a result of said kneading step, said generally oblate spheroids of dough accumulating in said discharge conduit and forming said dough stream upon exiting a discharge orifice of said discharge conduit; and shaping said dough into a desired form.

10. A method for continuously producing a stress free stream of dough comprising the sequential steps of:

continuously supplying a regulated quantity of blended dry ingredients to a mixing chamber to create a mixed stream of dry ingredients;

continuously injecting a regulated volume of liquid ingredients into said continuously moving stream of dry ingredients;

continuously mixing said dry ingredients and said liquid ingredients to form a dough paste stream;

continuously kneading said dough paste stream to produce a dough mass; and continuously discharging said dough mass after said kneading step without damaging a gluten network in said dough mass, said dough mass being discharged through a discharge conduit having a generally rectangular configuration, said discharge conduit coalescing said dough mass during said discharge step to form a continuous dough stream without damaging said gluten network, said dough stream being formed from generally oblate spheroids of dough which are repeatedly lapped onto one another in said discharge conduit as a result of said kneading step, said generally oblate spheroids of dough accumulating in said discharge conduit and forming said dough stream upon exiting a discharge orifice of said discharge conduit.

11. A method for producing a stress free sheet of dough comprising the steps of:

measuring dry ingredients;

measuring liquid ingredients;

mixing said dry ingredients and said liquid ingredients to form a dough paste mass;

kneading said dough paste mass to produce a continuous dough stream;

after kneading of said dough stream, continuously discharging said dough stream without damaging a gluten network of said dough developed during said kneading step, said dough stream being discharged through a discharge conduit of pre-determined flow resistance, said dough stream being formed from generally oblate spheroids of dough which are repeatedly lapped onto one another in said discharge conduit as a result of centrifugal force generated during said kneading step, said generally oblate spheroids of dough accumulating in said discharge conduit and forming said dough stream upon exiting a discharge orifice of said discharge conduit; and forming said dough stream after emerging from said discharge orifice of said discharge conduit into a continuously moving sheet of dough while maintaining said gluten network in an undamaged condition.

12. A method for producing a stress free stream of dough comprising the steps of:

measuring dry ingredients;

measuring liquid ingredients;

mixing said dry ingredients and said liquid ingredients to form a dough paste mass;

kneading said dough paste mass to produce a continuous dough stream;

continuously discharging said dough stream through a discharge conduit without damaging a gluten network formed in said dough stream, said dough stream being formed from generally oblate spheroids of dough which are repeatedly lapped onto one another in said discharge conduit as a result of said kneading step, said generally oblate spheroids of dough accumulating in said discharge conduit and forming said dough stream upon exiting a discharge orifice of said discharge conduit; and shaping said dough stream into a desired form.

* * * * *